United States Patent [19]

Hitomi et al.

[11] Patent Number: 4,932,378

[45] Date of Patent: Jun. 12, 1990

[54] INTAKE SYSTEM FOR INTERNAL COMBUSTION ENGINES

[75] Inventors: Mitsuo Hitomi; Yasuhiro Yuzuriha; Katsumi Okazaki; Junso Sasaki, all of Hiroshima, Japan

[73] Assignee: Mazda Motor Corporation, Hiroshima, Japan

[21] Appl. No.: 111,880

[22] Filed: Oct. 23, 1987

[30] Foreign Application Priority Data

Oct. 30, 1986 [JP] Japan .................................. 61-256768

[51] Int. Cl.⁵ ............................................ F02B 27/00
[52] U.S. Cl. .................................... 123/432; 123/308; 123/405
[58] Field of Search ..................... 123/52 M, 308, 432, 123/405

[56] References Cited

U.S. PATENT DOCUMENTS 4,552,112 11/1985 Nagao et al. ......................... 123/432
4,612,903 9/1986 Urabe et al. ......................... 123/432
4,738,233 4/1988 Hitomi et al. ................... 123/432 X

FOREIGN PATENT DOCUMENTS 2901186 7/1980 Fed. Rep. of Germany ...... 123/432
107018 8/1980 Japan .
82522 5/1984 Japan ................................... 123/308
226264 12/1984 Japan ................................... 123/432

Primary Examiner—Tony M. Argenbright
Attorney, Agent, or Firm—Fleit, Jacobson, Cohn, Price, Holman & Stern

[57] ABSTRACT

An intake system with a simple and compact structure for an internal combustion engine having a plurality of cylinders each cylinder having an intake port, the opening timing of the intake ports being determined so that that of each cylinder overlaps with that of another in which the intake stroke takes place subsequently to that in the former, the intake system comprising intake passges each being connected to the intake port of one of the cylinders, a juction portion connected to the respective intake passages, a resonance intake passage connected to the junction portion at one end thereof, in which the intake pressure resonance effect is to be produced and control valves provided in the respective intake passages, the opening timing of the respective control valves being determined so as to be retarded relative to that of said respective intake ports under at least a low speed and heavy load engine operating condition.

3 Claims, 12 Drawing Sheets

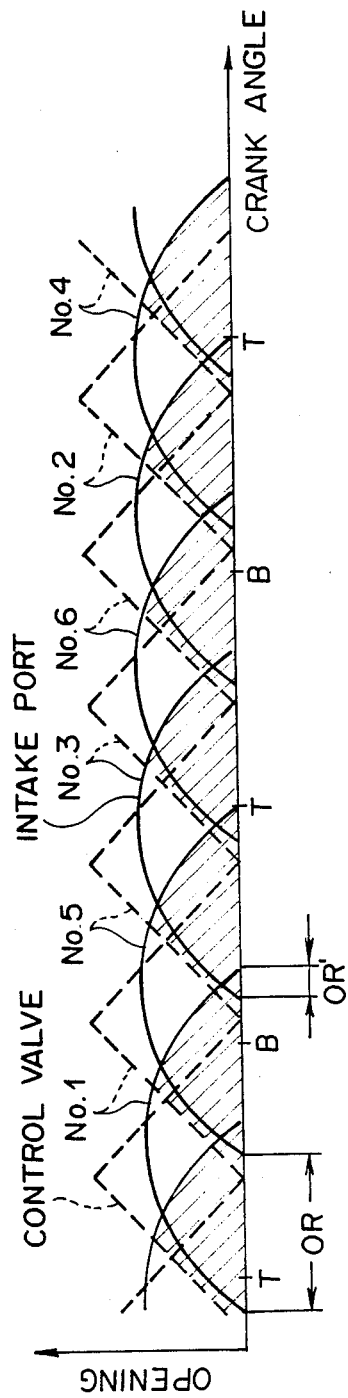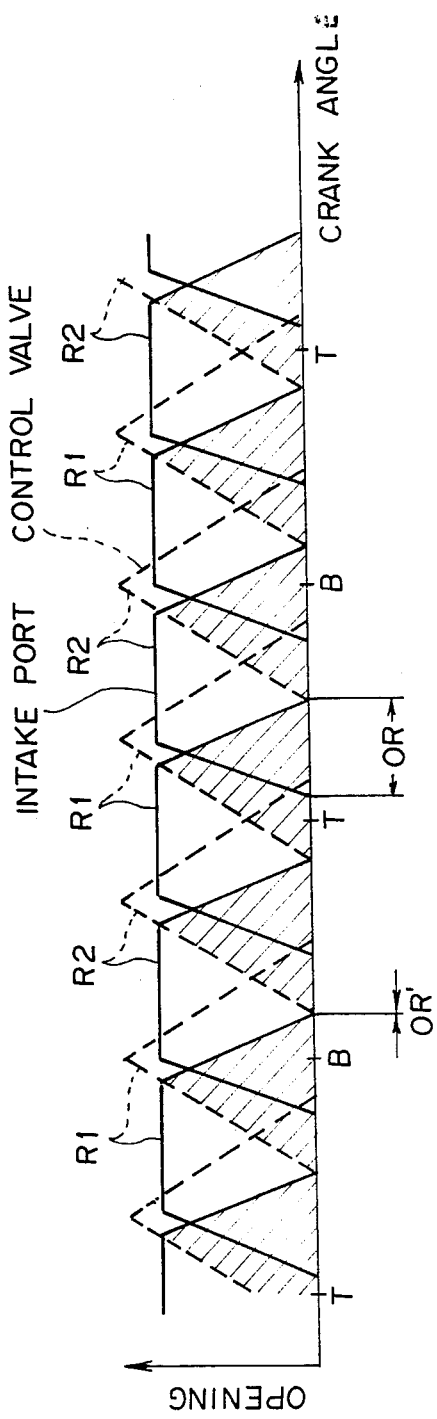

INTAKE SYSTEM FOR INTERNAL COMBUSTION ENGINES

CROSS REFERENCE OF RELATED APPLICATIONS

The present invention relates generally to the subject matter of the following prior U.S. patent application Ser. No. 832,409, filed Feb. 24, 1986, entitled "Intake System For Internal Combustion Engines", now U.S. Pat. No. 4,738,233.

BACKGROUND OF THE INVENTION

The present invention relates to an engine intake system, and more particularly to an engine intake system wherein an intake pressure resonance effect is utilized to increase the intake charge.

DESCRIPTION OF THE PRIOR ART

Hithertofore, it has been proposed to accomplish a high engine output by increasing the intake charge through utilization of the inertia of the intake flow, the intake pressure resonance effect or the intake flow dynamic effect. In case where an increase in the intake charge is sought through utilization of the inertia of the intake flow, since a negative compression wave produced in the intake passage is reversed into a positive compression wave by a surge tank etc. and a larger amount of the intake air is forced into a cylinder by utilizing this positive compression wave, it is very difficult to obtain improved results in increasing the intake charge at an engine rpm other than a specific engine rpm. In view of this problem, Japanese patent application No. 54-12817 filed on Feb. 8, 1979 and disclosed for public inspection on Aug. 16, 1980 under the publication No. 55-107018 proposes an engine intake system including an intake air reservoir provided in the intake passage, and a control valve located in the intake passage between the reservoir and the intake valve. This Japanese patent application teaches to control the opening timing of the control valve in accordance with the engine speed to thereby change the timing at which the negative compression wave is produced. Thus, the proposed intake system is effective to a certain extent to expand the engine speed range over which the compression wave can be utilized to increase the intake charge.

However, since the positive compression wave obtained by reversing the negative compression wave is utilized for introducing the intake air into the cylinder in the method utilizing the inertia of the intake flow, it is difficult to obtain improved results in increasing the intake charge in the low engine speed range, although it is possible to improve the intake charge in the high engine speed range.

On the other hand, in case where the intake pressure resonance effect is utilized to increase the intake charge, it is possible to realize a great increase in the intake charge in the low engine speed operation as compared with utilizing the inertia of the intake flow. More specifically, in case where the intake pressure resonance effect is utilized to increase the intake charge, a resonance intake passage in which the resonance takes place is connected to a junction portion where a plurality of intake passages each leading to one of cylinders are connected and a continuous negative pressure wave is produced by synchronuously opening and closing an intake port of each cylinder and the intake pressure resonance is produced by the negative compression wave in the resonance intake passage. Therefore, the amplitude of oscillation of the intake air can be larger than that produced by the inertia of the intake flow and the intake charge can be effectively increased even during a low engine speed operation.

However, in an internal combustion engine having a plurality of cylinders, the opening period of the intake port of each cylinder is often set to overlap with that of others, and if the overlapping period is set long, the intake charge cannot be sufficiently increased by the intake pressure resonance effect due to the interference of intake air between two or more cylinders. For solving this problem, Japanese Patent Publication No. 59-14169 proposes an engine intake system in which a plurality of cylinders are divided into two groups of cylinders each consisting of cylinders the intake stroke, in the case of a gasoline engine, the ignition, of which does not subsequently take place and in which the intake charge is increased by utilizing the intake pressure resonance effect for each group of cylinders independently.

However, the structure of this prior art intake system inevitably becomes very complicated.

SUMMARY OF THE INVENTION

It is therefore an object of the present invention to provide an intake system for an internal combustion engine having a plurality of cylinders capable of increasing the intake charge by utilizing the intake pressure resonance effect with a simple structure.

According to the present invention, the above and other objects can be accomplished by an intake system for an internal combustion engine having a plurality of cylinders each cylinder having an intake port, the opening timing of said intake ports being determined so that that of each cylinder overlaps with that of another in which the intake stroke takes place subsequently to that in the former, said intake system comprising intake passage means each being connected to said intake port of one of said cylinders, junction means connected to said respective intake passage means, resonance intake passage means connected to said junction means, in which the intake pressure resonance effect is to be produced and control valve means provided in said respective intake passage means, the opening timing of said control valve means being determined so as to be retarded relative to that of said respective intake ports under at least a low speed and heavy load engine operating condition.

The above and other objects and features of the present invention will become apparent from the following descriptions of preferred embodiments taking reference to the accompanying drawings.

BRIEF DESCRIPTION OF THE DRAWINGS

FIG. 3b is a diagram showing an intake pressure resonance effect obtained by opening and closing intake valves in accordance with the valve timing shown in FIG. 3a.

FIG. 7 is a diagram showing the valve timing in the intake system shown in FIGS. 5 and 6.

FIG. 10 is a diagram showing the valve timing in the intake system shown in FIGS. 8 and 9.

DESCRIPTION OF THE PREFERRED EMBODIMENTS

Figure 1:
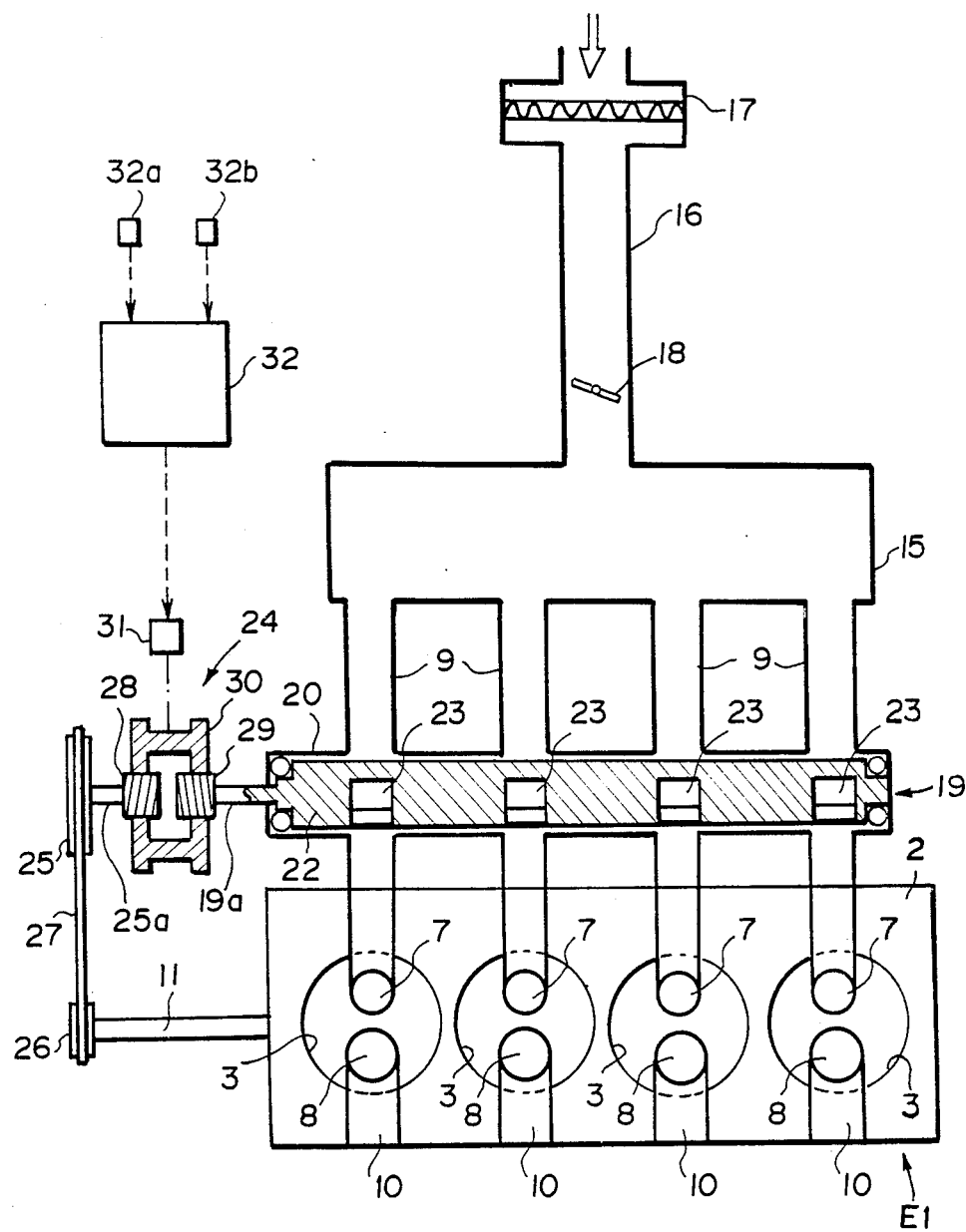
FIG. 1 is a schematic top plan view of an engine in accordance with one embodiment of the present invention.
Figure 2:
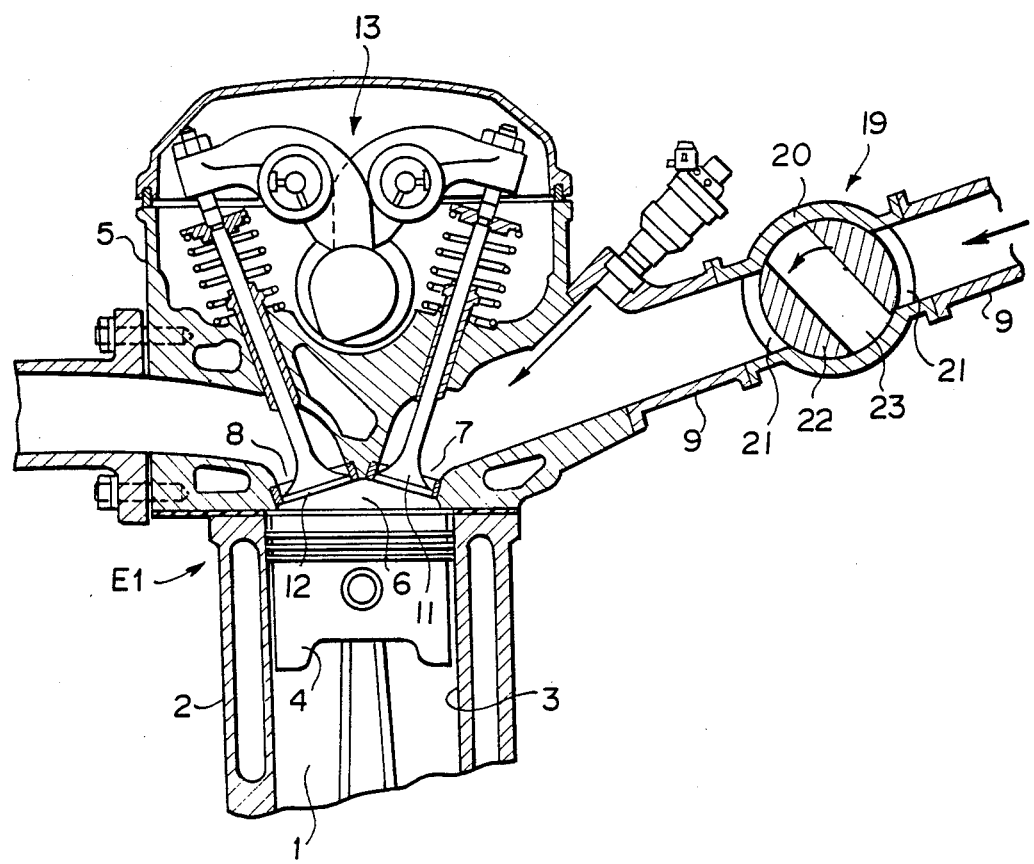
FIG. 2 is a vertical sectional view of the engine shown in FIG. 1.

Referring to FIGS. 1 and 2, there is shown a reciprocating engine E1 having four in-line cylinders 1 and including a cylinder block 2 formed with four cylinder bores 3. In each of the cylinder bores 3, there is disposed a piston 4 for reciprocating movement. Above the cylinder block 2, there is a cylinder head 5 which is secured to the cylinder block 2. Thus, a combustion chamber 6 is defined in each cylinder bore 3 in the cylinder block 2.

The cylinder head 5 is formed with an intake port 7 and an exhaust port 8 which open to each cylinder bore 3. The cylinder head 5 is further formed with an intake passage 9 and an exhaust passage 10 which respectively communicate with the intake port 7 and the exhaust port 8. The intake port 7 is provided with an intake valve 11 and the exhaust port 8 is provided with an exhaust valve 12. The respective intake valve 11 and exhaust valve 12 are connected with a valve driving mechanism 13 and are respectively opened and closed at a timing synchronous with the rotation of a crank shaft (engine output shaft) 14.

The intake passage 9 of each cylinder 1 is connected to a junction portion 15 having a large volume and the junction portion is connected with a main intake passage 16 in which an air cleaner 17 and a throttle valve 18 are provided. The length of the portion of the main intake passage 16 between the junction portion 15 and the air cleaner 17 is determined so that the air cleaner 17 operates as a compression wave reversing tank and the intake pressure resonance effect is produced in the portion.

In the intake passages 9 downstream the junction portion 15, there is provided a rotary type control valve 19 which is of a hollow cylindrical configuration having a cylindrical wall 20 formed with openings 21 at positions corresponding to the respective intake passages 9, and a rotor 22 provided in the wall 20 and formed with openings 23 diametrically extending and corresponding to the openings 21. The inside of the control valve 19 is cyclically opened to the intake passages 9 at an appropriate timing as the rotor 22 is rotated synchronously with the engine rotation. The rotary type control valve 19 has a drive shaft 19a which is connected through a timing mechanism 24 with a pulley 25. The engine E1 has a crank shaft 14 which carries a driving pulley 26. An endless belt 27 is passed around the pulleys 25 and 26 so that rotation of the crank shaft 14 is transmitted to the pulley 25 and then through the timing mechanism 24 to the shaft 19a of the rotary type control valve 19 to drive the same. The pulley 25 has a larger diameter than that of the pulley 26 so that the rotary type control valve 19 is rotated at half the speed of the crank shaft 14.

The timing mechanism 24 includes a helical gear 28 secured to the shaft 25a of the pulley 25 and a helical gear 29 secured to the shaft 19a of the control valve 19. The gears 28 and 29 are opposed to each other and an adjusting dog 30 is in meshing engagement with the helical gears 28 and 29. The rotation of the pulley 25 is therefore transmitted through the gear 28, the dog 30 and the gear 29 to the rotary type control valve 19. The dog 30 is displaceable in the axial direction and through such axial displacement, it is possible to change the angular phase of the gear 29 with respect to that of the gear 28. Thus, it is possible to control the opening timing of the control valve 19 by an axial displacement of the dog 30.

In order to determine the axial position of the adjusting dog 30, there is provided an actuator 31 which is of a type that is operated under the control of a signal from an electronic control unit 32 preferably comprising of a microprocessor. The control unit 32 receives an engine speed signal from a speed detector 32a and an engine load signal such as an intake air amount signal, a throttle valve opening signal and the like from a load detector 32b. The control unit 32 determines the opening timing of the control valve 19 and operates the actuator 31 so that the desired valve timing is obtained.

Figure 3A:
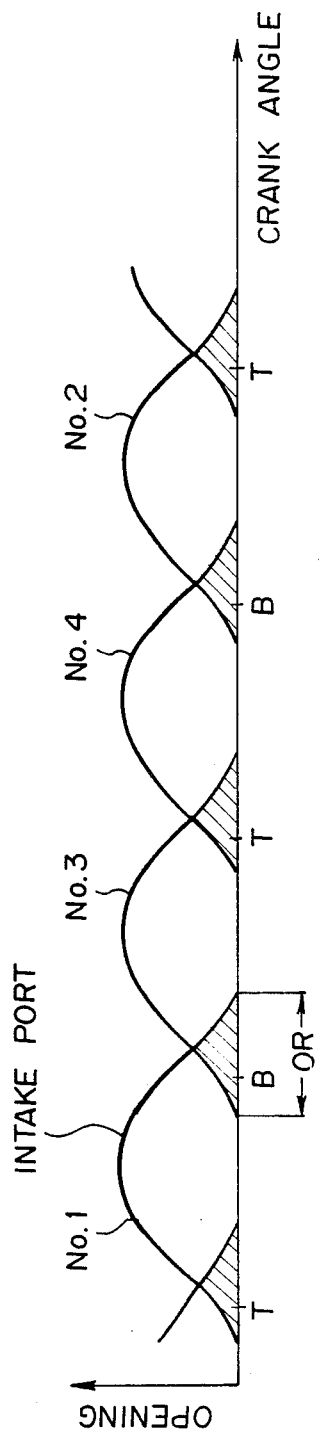
FIG. 3a is a diagram showing the valve timing of intake valves in the intake system which is an embodiment of the present invention.

In the illustrated embodiment, the ignition takes place in the order of cylinders No. 1, No. 3, No. 4 and No. 2, where the cylinders are designated as No. 1, No. 2, No. 3 and No. 4 in the order of the cylinders from one end of the crank shaft 14 to the other end thereof. FIG. 3a shows a valve timing chart for the intake valves 11. It is assumed for four-cycle reciprocating engines that the intake valve 11 is opened, if the amount of lift is more than or equal to 1 mm. As shown by "OR" in FIG. 3a, the valve opening period of each cylinder considerably overlaps with that of the cylinder in which the ignition takes place subsequently thereto. In FIG. 3a, T designates top dead center and B designates bottom dead center, respectively.

Figure 3B:
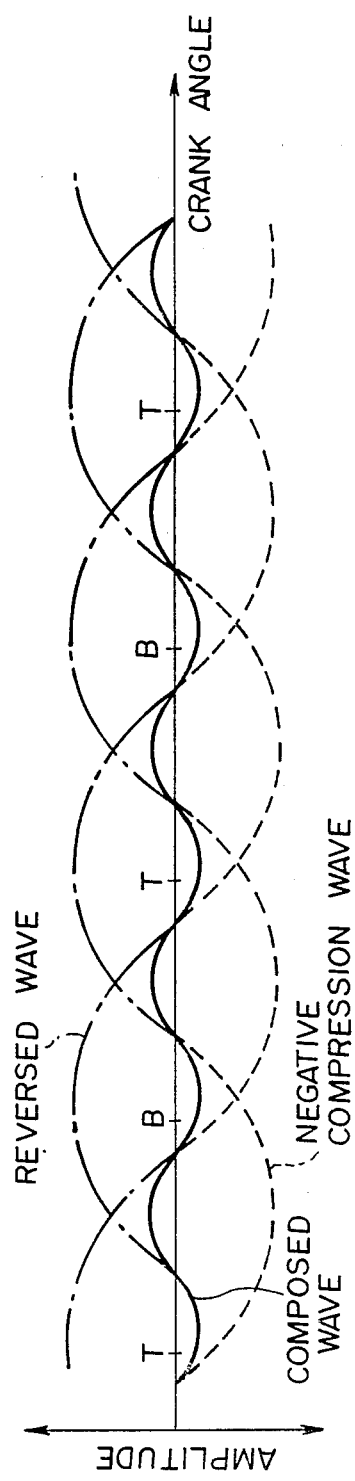
Figure 4A:
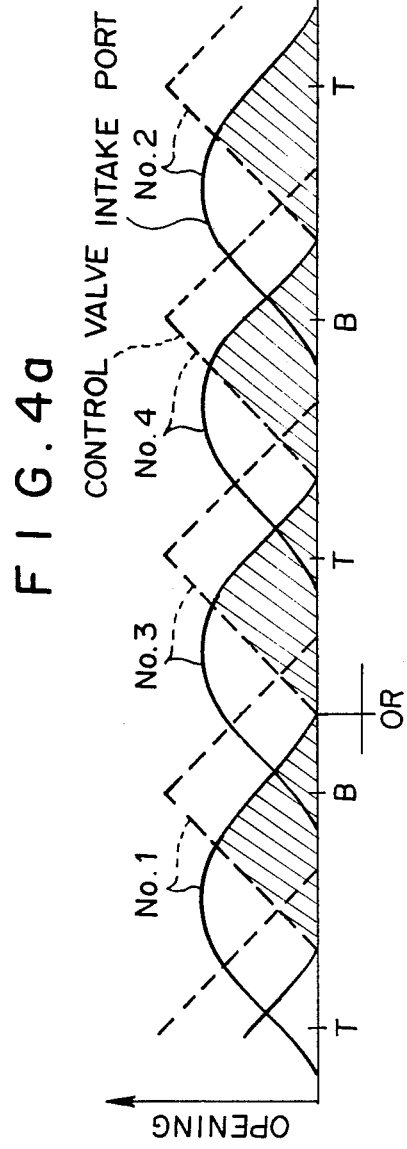
FIG. 4a is a diagram showing the valve timing of intake valves and timing valves in the intake system which is an embodiment of the present invention.
Figure 4B:
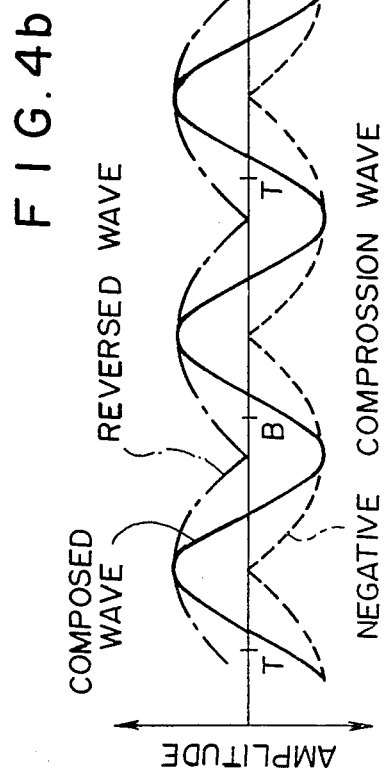
FIG. 4b is a diagram showing an intake pressure resonance effect obtained by the intake system which is an embodiment of the present invention.

In this embodiment, under an engine operating condition other than low speed and heavy load engine operation, the opening period of the control valve 19 is determined substantially the same as that of the intake valve 11 so that the intake air is introduced into each cylinder over the period wherein the intake valve 11 is opened. On the contrary, as shown in FIG. 4a, under low speed and heavy load engine operation, the opening period of the control valve 19 is retarded as shown by dotted lines in FIG. 4a so that the control valve 19 is opened after the intake top dead center and that the intake period of each cylinder 1 does not overlap with that of the cylinder 1 in which the ignition takes place subsequently. It is found that when the opening timing of the control valve 19 is set with respect to that of the intake valve 11 as described above, the interference of intake air between cylinders can be prevented and the intake charge can be remarkably increased by utilizing the intake pressure resonance effect within the main intake passage 16. Particularly, as shown in FIG. 4a, since the control valve 19 is opened after the intake top dead center, by the time the control valve 19 is opened and a sufficient amount of negative pressure is produced in the intake passage 9 downstream the control valve 19, it becomes possible to increase the amplitude of the negative compression wave utilized for the intake pressure resonance effect, whereby the intake pressure resonance effect can be strengthened. FIG. 3b shows the intake pressure resonance effect produced by opening and closing the respective intake valves 11 of the cylinders 1 in accordance with the valve timing shown in FIG. 3a and the amplitude of a composed wave produced by composing a negative compression wave and a reversed wave is very small due to the interference of intake air between cylinders 1. On the other hand, as shown in FIG. 4b, in case where the respective intake valves 11 and control valves 19 of the cylinders 1 are opened and closed so that the intake period of each cylinder 1 does not overlap that of the one in which ignition takes place subsequently, the amplitude of a composed wave produced by composing a negative compression wave and a reversed wave is very large, since the interference of intake air can be prevented and the intake pressure resonance effect produced by opening and closing the intake ports 7 can be effectively utilized. Comparing the wave forms of the composed wave in FIG. 4b and that in FIG. 3b, it is apparent that the amplitude of the composed wave produced in this embodiment is much larger than that in FIG. 3b and that the intake pressure resonance effect can be remarkably improved in this embodiment.

Although the opening timing of the control valve 19 is set so in this embodiment that the overlap between the intake periods of cylinders in which the ignition takes place subsequently is zero under a low speed and heavy load engine operating condition, it is generally preferable for four-cycle reciprocating engines to set the valve timing of the control valve terms of the angle of the crank shaft 14 so that the overlap is within ±25% of 720 degrees/the number of cylinders in order to meet the requirements that a sufficiently long intake period is ensured and that the interference of intake air is minimized.

Figure 5:
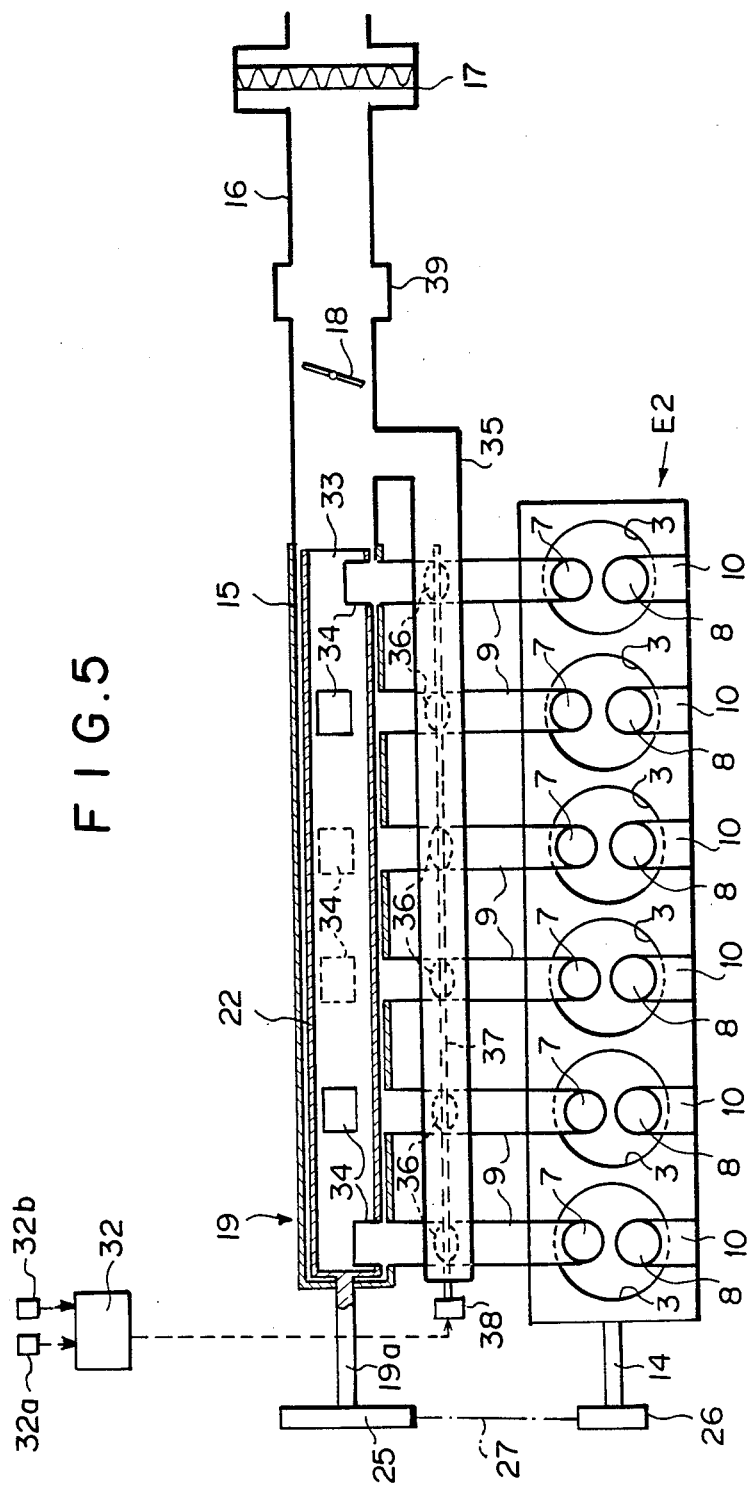
FIG. 5 is a schematic top plan view of an engine in accordance with another embodiment of the present invention.
Figure 6:
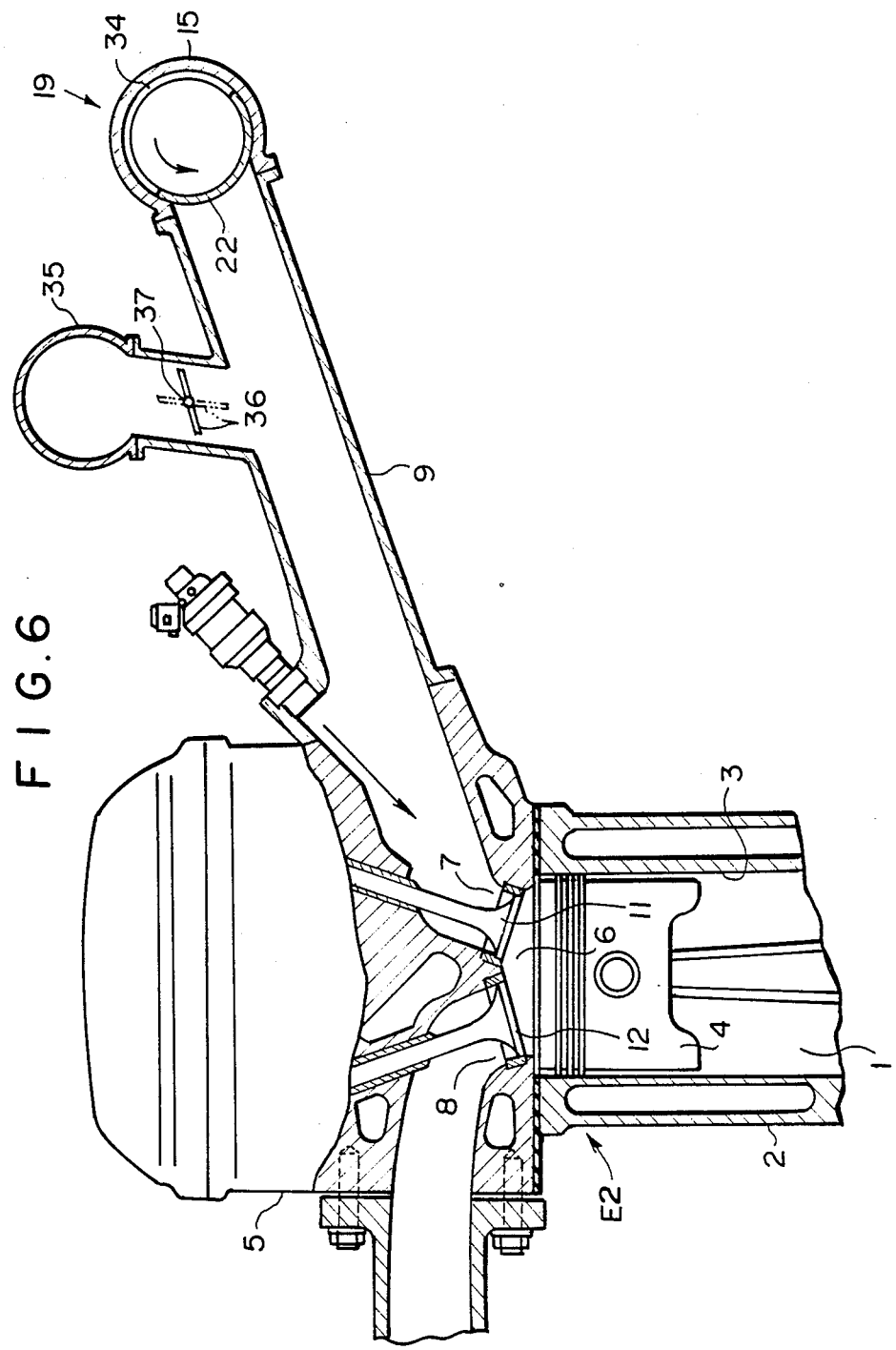
FIG. 6 is a vertical sectional view of the engine shown in FIG. 5.

FIGS. 5 to 7 show a six-cylinder reciprocating engine E2 including an intake system which is another embodiment of the present invention and the basic structure of the intake system is the same as that in the previous embodiment so that corresponding parts are designated by the same numerals as in the previous embodiment.

In this embodiment, the junction portion 15 is of a hollow cylindrical configuration extending in the direction of the arrangement of cylinders 1 and the main intake passage 16 is connected to one end thereof. The rotary type control valve 19 is provided so that its wall serves as a wall 20 of the junction portion 15. The rotor 22 is also of a cylindrical configuration and the inside thereof is communicated with the main intake passage 16 at one opening 33 thereof so that the inside thereof is filled with intake air. The wall of the rotor is formed with the openings 34 communicateable with the respective intake passages 9. In this embodiment, no timing mechanism 24 is provided and the rotary type control valve 19 is connected through the pulley 25, the endless belt 27 and the pulley 26 with the crank shaft 14. It is therefore impossible to change the phase of the control valve 19 with respect to the crank shaft 14 but in place of the timing mechanism 24 in order to control the intake period of each cylinder 1 in accordance with an engine operation, a bypass passage 35 is provided in this embodiment for connecting the main intake passage 16 downstream the throttle valve 18 with the individual intake passage 9 bypassing the control valve 19 as shown in FIG. 5. The bypass passage 35 has bypass valves 36 for controlling the communication between the bypass passage 35 and the individual intake passages 9. The bypass valves 36 are secured to a rotatable shaft 37 driven by an actuator 38 controlled by the control unit 32 so that all bypass valves 36 can be closed under a low speed and heavy load engine operation and opened under other engine operation at the same time by rotating the shaft 37 by the actuator 38.

Referring to FIG. 7, in this embodiment, the ignition takes place in the order of No. 1, No. 5, No. 3, No. 6, No. 2 and No. 4 and the valve timings of the respective intake valves 9 are determined in accordance with the ignition order and the overlapping period "OR" between the opening periods of cylinders in which the ignition takes place successively is set rather large. The valve timing of the control valve is determined as shown by dotted lines in FIG. 7 so that the overlapping period between the intake periods of cylinders in which the ignition takes place successively becomes small as shown by "OR'".

Under a low speed and heavy load engine operating condition, since all of the bypass valves 36 are closed, the intake air is introduced into each of the cylinders 1 during the period as shown by hatching in FIG. 7 when both the intake valve 11 and the control valve 19 are opened. In this embodiment, since the overlapping period of the intake periods between the cylinders 1 is set small and the interference of intake air is reduced, it is possible to increase the intake charge by effectively utilizing the intake pressure resonance effect produced in the main intake passage 16 between the junction portion 15 and the air cleaner 17.

Under an engine operating condition other than the low speed and heavy load engine operating condition, since the bypass valve 36 is opened and the intake air is introduced into each of the cylinder 1 through the bypass passage 35, the intake period is substantially the same as the opening period of the intake port 7, whereby a sufficient intake period is ensured.

Further, in this embodiment, there is provided a portion 39 having a larger volume so that it is possible to reduce the length of the main intake passage 16 required for producing the resonance effect therein.

Figure 8:
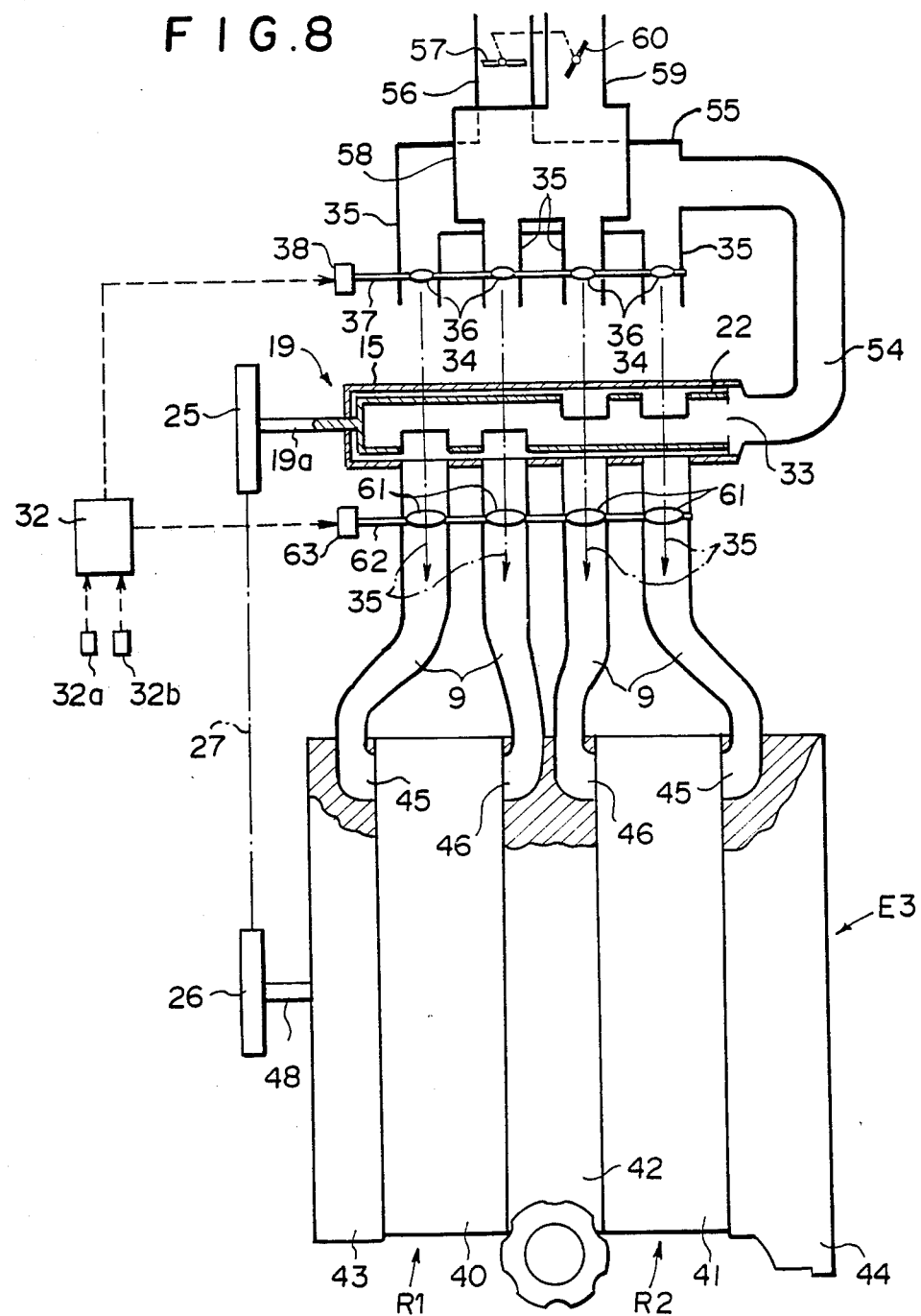
FIG. 8 is a schematic top plan view of an engine in accordance with a further embodiment of the present invention.
Figure 9:
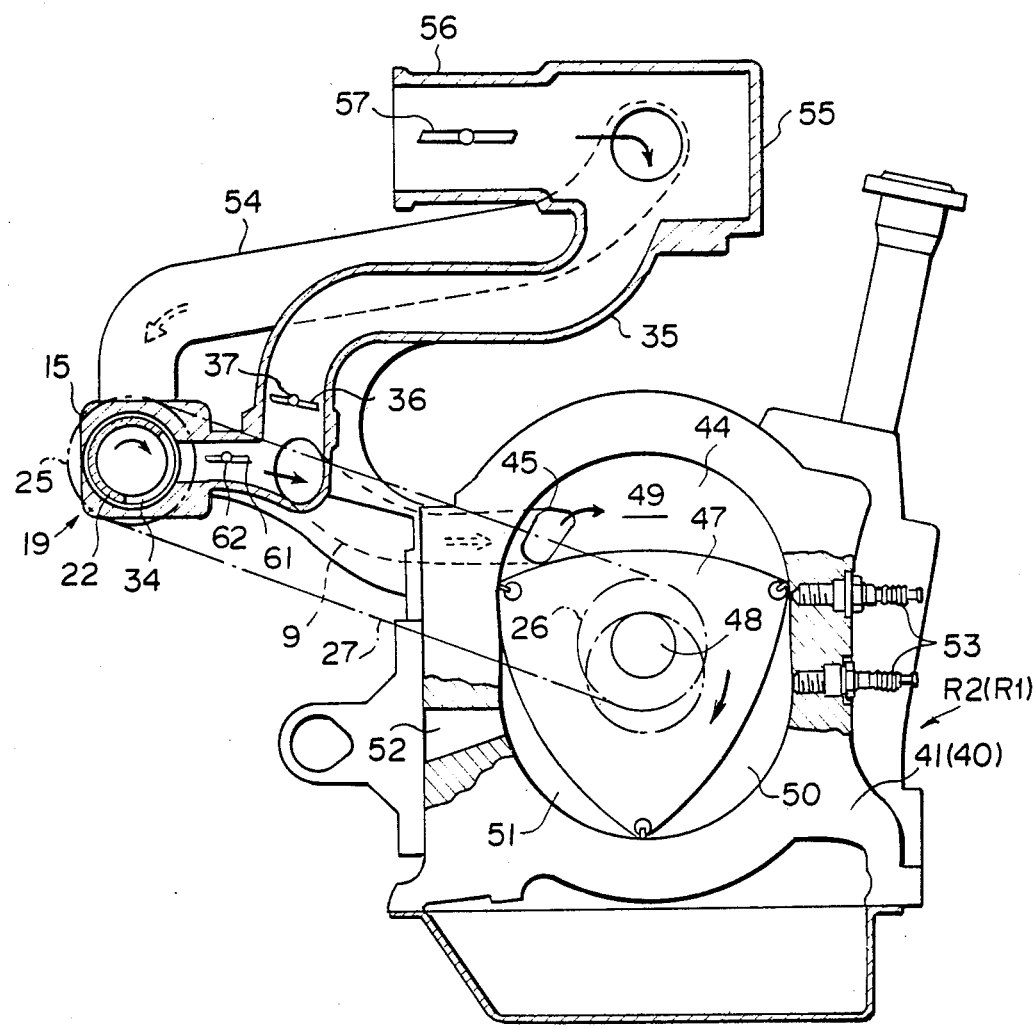
FIG. 9 is a vertical sectional view of the engine shown in FIG. 8.

Referring to FIG. 8 to 10, there is shown a two-rotor type rotary piston engine E3 including an intake system which is a further embodiment of the present invention. Front and rear engine sections R1 and R2 respectively have rotor housings 40 and 41 which are formed with inner walls of peritrochoidal configuration. An intermediate housing 42 is located between the rotor housings 40 and 41 to separate them one from the other. The outer sides of the rotor housings 40 and 41 are attached with side housings 43 and 44 and the inner walls of which are formed with secondary intake ports 45. Thus, the rotor housings 40 and 41, the side housings 43 and 44, and the intermediate housing 42 constitute a casing in which a pair of rotor cavities are defined. On the opposite faces of the intermediate housing 42, there are formed primary intake ports 46 opening to respective rotor cavities. The primary intake ports 46 and the secondary intake ports 45 are opened and closed at the same timing.

As well known in the art, in each of the rotor cavities, there is disposed a rotor 47 of the shape of the peritrochoid inner envelope. The rotor 47 is carried by an eccentric shaft 48 (engine output shaft) and is planetarily rotatable with apex portions in sliding contact with the inner wall of the rotor housing 40 or 41. Thus, in each of the rotor cavities in the casing, there are defined three working chambers 49, 50 and 51 whose volumes cyclically change as the rotor 47 rotates. As shown in FIG. 9, there are provided an exhaust port 52 and an ignition plug 53. FIG. 9 shows that the working chamber 49 is in the intake stroke, that the working chamber 50 is in the expansion stroke and that the working chamber 51 is in the exhaust stroke. For one working chamber 49, 50 or 51, the intake stroke, the compression stroke, the expansion stroke and the exhaust stroke take place per one rotation of the rotor 47 and the eccentric shaft 48 rotates three times per one rotation of the rotor 47. Therefore, each of the intake, compression, expansion and exhaust strokes continues while the eccentric shaft 48 rotates by 270 degrees.

Each of the primary and secondary intake ports 46 and 45 is communicated through the intake passage 9 with the inside of the rotor 22 of the control valve 19, which has the same configuration as that in the preceding embodiment shown in FIGS. 5 and 6. The inside of the rotor 22 of the control valve 19 is further communicated at one opening end 33 with a secondary intake passage 54 in which the intake pressure resonance is produced and which is connected to a secondary surge tank 55 which is a negative wave reversing portion. An upstream secondary intake passage 56 provided with a secondary throttle valve 57 therein is connected to the secondary surge tank 55.

Further, there is provided a primary surge tank 58 connected with a primary intake passage 59 having a primary throttle valve 60. The valve timings of the primary and secondary throttle valves 60 and 57 are determined so that the secondary throttle valve 57 begins to be opened when the opening of the primary throttle valve 60 reaches a predetermined value. The bypass passages 35 are provided in a similar manner to the preceding embodiment shown in FIGS. 5 and 6 and there is provided for each of the bypass passages 35 a bypass valve 36 secured to a shaft 37 rotatable by the actuator 38 in accordance with the instruction signal output from the control unit 32. The primary surge tank 58 is connected with the two bypass passages 35 each communicated through the intake passage 9 with the primary intake port 46 and the secondary surge tank 55 is connected with the two bypass passages 35 each communicated through the intake passage 9 with the secondary intake port 45. There is provided between the control valve 19 and a portion where the bypass passage branches off in each of the intake passages 9 an additional control valve 61 secured to a shaft 62 rotatable by an actuator 63. In accordance with the instruction signal from the control unit 32, the actuator 63 rotates the shaft 62 so that all of the additional control valves 61 are opened and closed at the same time.

Referring to FIG. 10, there is shown an opening and closing timing chart of the primary and secondary intake ports 46 and 45. As mentioned above, the opening and closing timings of the primary and secondary intake ports 46 and 45 are set to be same. As shown in FIG. 10, the opening period of the intake ports 46 and 45 of one engine section R1 or R2 is set to have a large overlap "OR" with that of the other. On the other hand, as shown by dotted lines, the valve timing of the control valve 19 is set so that the intake periods of the front and rear engine sections R1 and R2 have no overlap "OR'" with each other and the intake periods of the front and rear engine sections are set as shown by hatching in FIG. 10.

In this embodiment, under a low speed and heavy load engine operating condition, the bypass valves 36 are closed and the additional control valves 61 are opened, whereby the primary and secondary intake ports 46 and 45 are communicated through the control valve 19 and the secondary intake passage 54 with the secondary surge tank 55. Since the secondary throttle valve 57 is opened under a heavy load engine operating condition, the intake pressure resonance effect is produced in the secondary intake passage 54 and the intake air is introduced into the engine section during the intake stroke by the resonance effect. As described above, since the intake period of one engine section R1 or R2 does not overlap with that of the other, remarkable intake pressure resonance effect can be produced and it is possible to considerably increase the intake charge. In the rotary piston engine, even if the intake period is restricted by the control valve to a part of the opening period of the intake port 46 or 45, since the opening period of the intake port 46 or 45 continues during the time when the eccentric shaft 48 rotates by 270 degrees and is relatively long as compared with the reciprocating engine, it is possible to ensure a sufficiently long intake period, whereby the intake charge can be increased more than that in the reciprocating engine.

On the other hand, under an engine operation other than a low speed and heavy load engine operation, the bypass valves 36 are opened while the additional control valves are closed, whereby the intake air is introduced into the engine section R1 or R2 bypassing the control valve 19. Under a light load engine operation, the intake air is introduced from the primary surge tank 58 to the engine section R1 or R2 through the primary intake port 46 and under a heavy load engine operation, the intake air is introduced from both of the primary and secondary surge tanks 58 and 55 into the engine section R1 or R2 through the primary and secondary intake ports 46 and 45.

Although the opening timing of the control valve 19 is set in the illustrated embodiment so that the overlap between the intake periods of cylinders in which the ignition takes place subsequently is zero under a low speed and heavy load engine operative condition, it is generally preferable for rotary piston engines to have the valve timing of the control valve in terms of the angle of the eccentric shaft 48 set so that the overlap is within ±25% of 360 degrees/the number of engine sections (cylinders) in order to meet the requirements that a sufficiently long intake period is ensured and that the interference of intake air is minimized.

Although omitted in FIGS. 8 and 9, there is provided a fuel injector or a vaporizer for feeding fuel in gasoline engines. In case where the vaporizer is provided, it can be located in the vicinity of the primary and secondary throttle valves 60 and 57 and in case where the fuel injector is provided, it can be located at a appropriate position such as in the intake passage 9 downstream the control valve.

Figure 11:
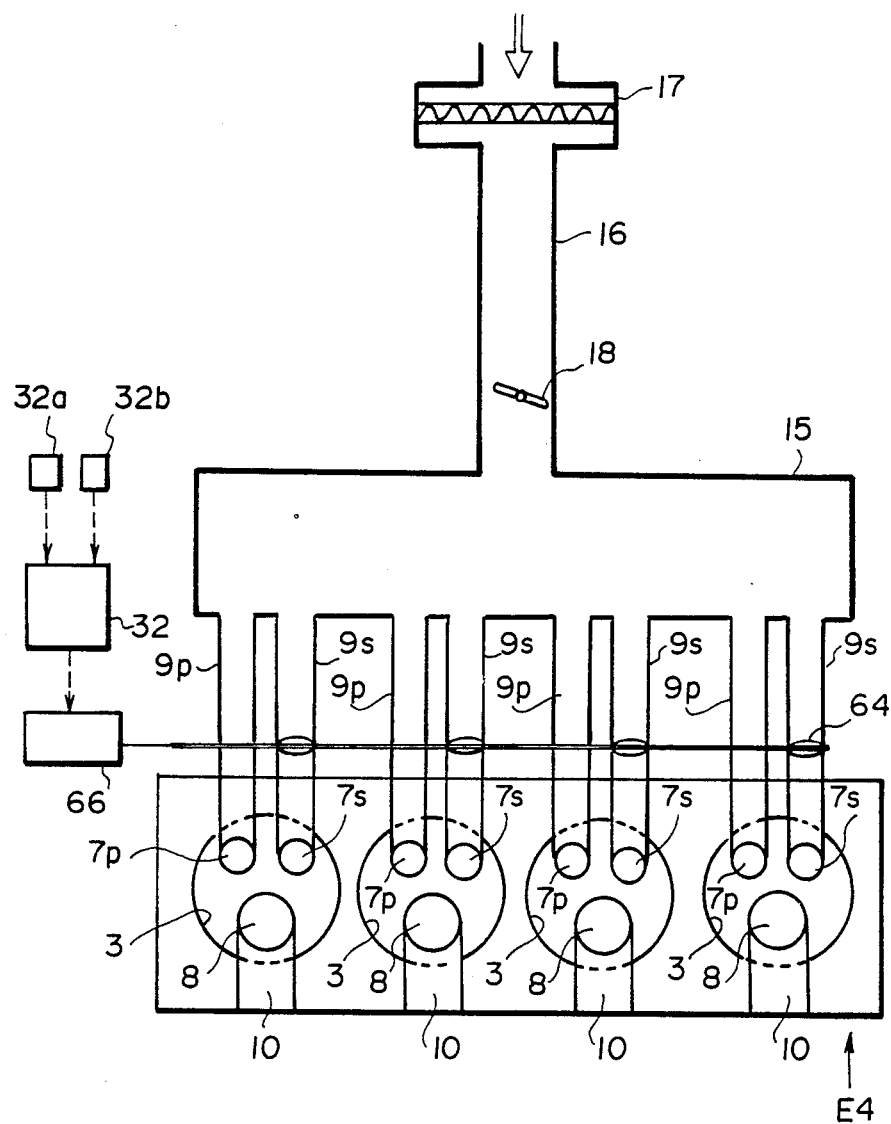
FIG. 11 is a schematic top plan view of an engine in accordance with a further embodiment of the present invention.

Referring to FIG. 11, there is shown a reciprocating engine E4 having four in-line cylinders 1 each cylinder of which has a primary intake port 7p and a secondary intake port 7s. A primary intake passage 9p is connected to each primary intake port 7p and a secondary intake passage 9s is connected to each secondary intake port 7s. The respective primary intake passages 9p and secondary intake passages 9s are connected to the junction portion 15 which is connected with the main intake port 16 and the air cleaner 17 is provided in the main intake passage 16 upstream of the junction portion 15. In each of the secondary intake passages 9s, there is provided a shutter valve 64 secured to a rotatable shaft 65 driven by an actuator 66. The actuator 66 is controlled by the control unit 32 so that the shutter valve 64 can be closed under low speed and heavy load engine operation and opened under other modes of engine operation by rotating the shaft 65.

Figure 12:
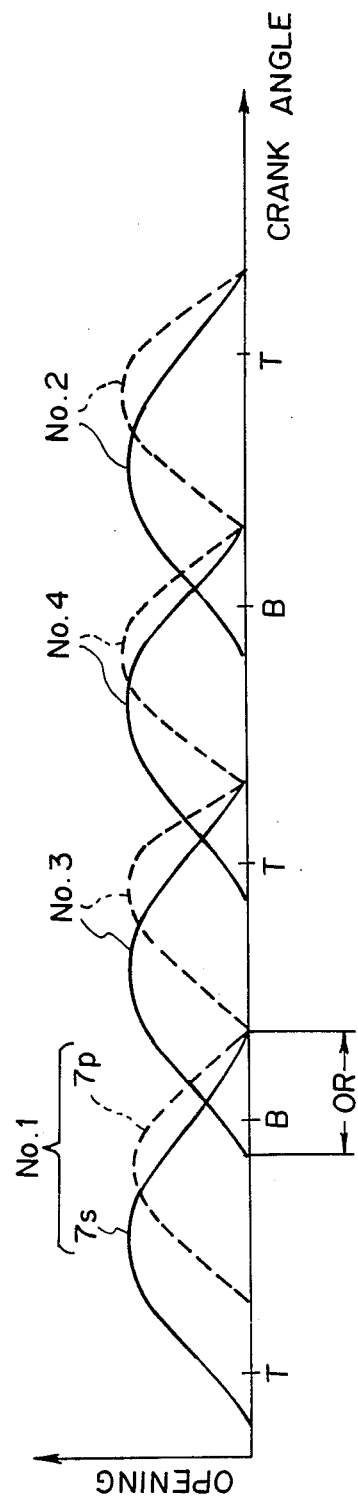
FIG. 12 is a diagram showing the valve timing in the intake system shown in FIG. 11.

As shown in FIG. 12, the ignition takes place in the order of cylinders No. 1, No. 3, No. 4 and No. 2 and the valve timing for the primary and secondary intake valves 7p and 7s is determined so that the valve opening period of the secondary intake valve 7s of each cylinder 1 considerably overlaps with that of the cylinder 1 in which the ignition takes place subsequently thereto as shown by "OR" but that the valve opening period of the primary intake valves 7p of the respective cylinders 1 do not overlap with each other as shown by dotted lines in FIG. 12. ( That is, "OR"=0.)

In this embodiment, under an engine operating condition other than low speed and heavy load engine operation, the intake air is introduced into each cylinder 1 through both of the primary and secondary intake ports 7p and 7s. On the contrary, under low speed and heavy load engine operation, since the secondary intake passage 9s is closed by the shutter valve 64, the intake air is introduced into each cylinder 1 through only the primary intake port 7p. As a result, since the overlap between the opening periods of the respective primary intake valves 7p is set to be zero, it is possible to increase the intake charge by effectively utilizing the intake pressure resonance effect produced in the main intake passage 16 between the junction portion 15 and the air cleaner 17 for the same reason as that described in connection with the previous embodiments.

In the above described embodiments, although the present invention is applied to four-cycle reciprocating engines and rotary piston engines, the present invention can be also applied to two-cycle engines. In this case, it is generally preferable for rotary piston engines to have the valve timing of the control valve in terms of the angle of the engine output shaft set so that the overlap is within ±25% of 360 degrees/the number of cylinders.

Figure 13:
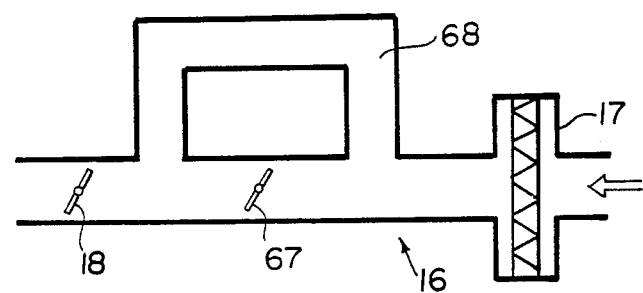
FIG. 13 is a schematic drawing showing a partial top plan view of the intake passage of an intake system which is a further embodiment of the present invention.
Figure 14:
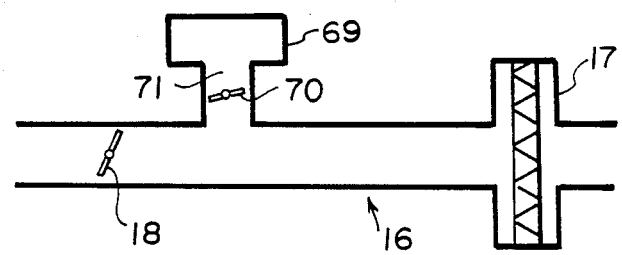
FIG. 14 is a schematic drawing showing a partial top plan view of the intake passage of an intake system which is a further embodiment of the present invention.

Referring to FIGS. 13 and 14, there is shown a improved structure for effectively producing the intake pressure resonance effect over a wide engine speed range in the intake system shown in FIGS. 1 and 2, 5 and 6, and 11. In this intake system shown in FIG. 13, the length of the main intake passage 16 between the junction portion 15 and the air cleaner 17 is designed so that the intake pressure resonance effect is produced therein under a high speed engine operation and there are provided a control valve 67 within the main intake passage 16 and a bypass passage 68 bypassing the control valve 67 between the junction portion 15 and the air cleaner 17 where the negative compression wave is reversed in the main intake passage 16. Under a low speed engine operation, the length of the main intake passage 16 in which the intake resonance is produced is lengthened by closing the control valve 67 for meeting conditions for producing the resonance effect. On the other hand, under a heavy load engine operation, the length of the main intake passage 16 in which the intake resonance is produced is shortened by opening the control valve 67 for meeting conditions for producing the resonance effect. The engine rpm may be determined as that at which a torque curve obtained when the control valve is opened and a torque curve obtained when the control valve is closed intersect each other.

Figure 15:
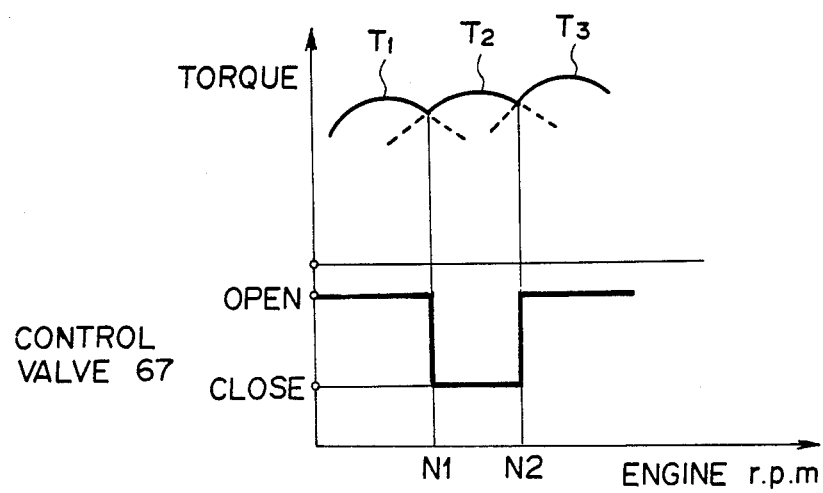
FIG. 15 is a diagram showing a torque curve obtained by an intake system shown in FIG. 14.

In the intake system shown in FIG. 14, the length of the main intake passage 16 between the junction portion 15 and the air cleaner 17 is designed so that the intake pressure resonance effect is produced therein under a medium speed engine operation and there are provided a tank 69 connected with the main intake passage 16 between the junction portion 15 and the air cleaner 17 in which the intake pressure resonance effect is produced and a control valve 70 in a passage 71 connecting the tank 66 with the main intake passage 16. Under an engine operating condition where the engine rpm is not more than N1, the control valve 70 is opened, whereby an engine rpm capable of producing the intake pressure resonance effect in the main intake passage 16 is lowered and the torque can be increased as shown by T1 in FIG. 15. On the other hand, under an engine operating condition where the engine rpm is more than N1 and not more than N2, the control valve 70 is closed, whereby the resonance effect is produced by reversing the negative compression wave at the air cleaner 17 and the torque can be increased as shown by T2 in FIG. 15. Further, under an engine operating condition where the engine rpm is more than N2, the control valve 70 is opened, whereby the resonance effect is produced by reversing the negative compression wave at the tank 69 and the torque can be increased as shown by T3 in FIG. 15.

According to the present invention, since the intake pressure resonance effect is effectively utilized for increasing the intake charge, it is possible to remarkably increase the intake charge, thereby increasing the torque under a low speed and heavy load condition with a compact structure.

Further, since a single intake passage is used as a common intake passage in which the intake pressure resonance effect is produced for all cylinders, the structure of the intake system can be very simple and compact, and the resonance effect can be easily produced over a wide engine speed range by changing the conditions for producing the resonance effect such as the length of the intake passage.

The present invention has thus been shown and described with reference to specific embodiments. However, it should be noted that the present invention is in no way limited to the details of the described arrangements but changes and modifications may be made without departing from the scope of the appended claims.

For example, although the rotary valve or the shutter valves are provided for controlling the overlap between the intake periods of the respective cylinders, a variable valve mechanism as disclosed in U.S. Pat. No. 4,690,110 or U.S. patent application Ser. No. 855,434 filed Apr. 24, 1986, now U.S. Pat. No. 4,726,322, can be employed to control the valve timing of the respective intake valves of the cylinders without employing the rotary valve or the shutter valves.

We claim:

1. An intake system for an internal combustion engine having a plurality of cylinders each having a plurality of intake ports, the opening timing of a part of said intake ports being determined so that that of each cylinder has some overlap with that of another in which the intake stroke takes place subsequently to that in the former and the opening timing of the rest of said intake ports being determined so that that of each cylinder has less overlap with that of another in which the intake stroke takes place subsequently to that in the former, said intake system comprising intake passage means each being connected to an intake port of one of said cylinders, junction means connected to said respective intake passage means, resonance intake passage means connected to said junction means at one end thereof, in which an intake pressure resonance effect is to be produced, shutter valve means provided in said respective intake passage means connected to said intake ports having the larger overlap with that of another cylinder and control means for controlling the opening timing of said shutter valve means so that said shutter valve means is closed under at least a low speed and heavy load engine operating condition.

2. An intake system in accordance with claim 1, wherein said internal combustion engine comprises four cylinders arranged in-line.

3. An intake system in accordance with claim 1, wherein the opening timing of the rest of said intake ports is determined so that the rest of each cylinder avoids overlapping with the rest of another cylinder in which the intake stroke takes place subsequently to the intake stroke in another cylinder.

* * * * *